United States Patent Office 3,254,109
Patented May 31, 1966

3,254,109
NITRATE ESTERS OF ALDEHYDE CYANO-
HYDRINS
Robert J. Hartle, Gibsonia, Pa., assignor to Gulf Research
& Development Company, Pittsburgh, Pa., a corporation of Delaware
No Drawing. Continuation of application Ser. No. 703,499, Dec. 18, 1957. This application Aug. 13, 1963, Ser. No. 301,893
3 Claims. (Cl. 260—465.1)

This application is a continuation of my application Serial No. 703,499, filed December 18, 1957, now abandoned.

This invention relates to new chemical compounds. More particularly, the invention relates to nitrate esters of aldehyde cyanohydrins and to methods of producing such esters.

123456 123456 789078907890 7890 123456 7890 123456

I have found that novel aldehyde cyanohydrin nitrates can be prepared by esterifying an aldehyde cyanohydrin derived from an aldehyde that contains as its characteristic substitutent a radical containing 1 to 18 carbon atoms, with nitric acid and under conditions normally employed in the esterification of alcohols with nitric acid. The radicals referred to can be saturated, unsaturated, straight chain, branched chain or cyclic, including aromatic and cycloaliphatic. Examples of such radicals include alkyl radicals such as methyl, n-undecyl, n-heptadecyl and 1-ethylpentyl, alkenyl and alkadienyl radicals such as n-heptadecenyl and n-heptadecadienyl, cycloalkyl radicals such as cyclohexyl and cyclopentyl, aryl radicals such as phenyl and naphthyl, alkaryl radicals such as tolyl, and aralkyl radicals such as benzyl. An example of another suitable radical is the cresyl radical. Aldehydes having an alkyl radical, preferably a $C_{1-12}$ alkyl radical, as the substituent group form a preferred class of cyanohydrin nitrates within the scope of this invention. An example of a preferred aldehyde cyanohydrin nitrate is 2-ethylhexaldehyde cyanohydrin nitrate. Examples of other nitrates of the preferred class are acetaldehyde cyanohydrin nitrate, octaldehyde cyanohydrin nitrate and lauraldehyde cyanohydrin nitrate. Examples of other aldehyde cyanohydrin nitrates included by the invention are stearaldehyde cyanohydrin nitrate, benzaldehyde cyanohydrin nitrate (mandelonitrile nitrate), p-tolualdehyde cyanohydrin nitrate, 1-naphthaldehyde cyanohydrin nitrate, cinnamaldehyde cyanohydrin nitrate, crotonaldehyde cyanohydrin nitrate, anthraldehyde cyanohydrin nitrate, cyclohexaldehyde cyanohydrin nitrate, and cyclopentaldehyde cyanohydrin nitrate.

The aldehyde cyanohydrin nitrates of this invention can be prepared in any convenient manner. For example, they can be prepared by esterification of an appropriate cyanohydrin under conditions conventionally employed in esterifying an alcohol with nitric acid. Thus, nitric acid having a strength in the range of about 70 to 100 percent, for example, white fuming nitric acid, can be used. In order to assist in driving the normally reversible esterification reaction to completion a molar excess, for example, a 1.1:1 to say 3:1 or higher mol ratio, of nitric acid to cyanohydrin is normally employed. However, other proportions can be used. In order to avoid oxidation and decomposition of the components of the reaction mixture, the reaction temperature is maintained below ambient room temperature (25° C.), preferably below about 15° C., but above the freezing point of the reaction mixture, for example, —5° C. to 10° C. As a further aid in driving the reaction to completion, it is preferred that water of esterification be removed by the use of a desiccant, that is, by hydration of an inert material having an affinity for water. Such material can also be a solvent for the reactants. An example of a suitable hydratable material having solvent characteristics is acetic anhydride. Examples of other desiccants are anhydrous sodium sulfate, calcium chloride and the like. The desiccant is desirably employed in a proportion sufficient to absorb the theoretical quantity of water that is liberatable during the esterification reaction. In instances where the desiccant is not a solvent for the reactants, it is desirable to employ some other inert organic solvent such as saturated hydrocarbons, e.g., pentane, hexane and heptane, chlorinated hydrocarbons, e.g., chloroform, carbon tetrachloride and methylene chloride, and ethers, e.g., diethyl ether, as a means of facilitating temperature control during the esterification reaction.

The esterification reaction will normally be substantially complete after about one-half to about six hours depending primarily upon the reaction temperature and the strength of the nitrating agent. Excellent results have been obtained with a reaction temperature of about 5° to 10° C., approximately 95 percent nitric acid, and a reaction period of about 2 to 3 hours.

When the esterification reaction is substantially complete, the reaction mixture is quenched by dilution, usually with water. The aldehyde cyanohydrin nitrates derived from aldehydes containing a water-insolubilizing hydrocarbon substituent, that is in this case a substituent containing more than about 5 carbon atoms, will normally separate spontaneously from the diluted reaction mixture and can be recovered merely by decanting. Cyanohydrin nitrates derived from lower molecular weight aldehydes are sometimes miscible in substantial proportions with the diluted nitric acid phase. These materials are conveniently separated by the use of an inert, water-immiscible, organic selective solvent therefor such as methylene chloride, chloroform, carbon tetrachloride, diethyl ether, hexane or the like.

The aldehyde cyanohydrin nitrates, or the hydroxy nitriles, from which the nitrate esters of this invention are derived can be prepared in any convenient manner. The preparation of these materials is conventional, and as such, does not form the essence of this invention. Consequently, such preparation need not be described in detail. However, in the interest of clarity, it may be mentioned that aldehyde cyanohydrins are normally prepared by addition of hydrocyanic acid to an aldehyde.

Example I

An aldehyde cyanohydrin nitrate (2-ethylhexaldehyde cyanohydrin nitrate) is prepared by admixture of 0.6 mol of freshly distilled 2-ethylhexaldehyde with a mixture of 1.0 mol of potassium cyanide in 250 milliliters of anhydrous diethyl ether. Acetic acid in the amount of 50 milliliters is added dropwise to the mixture with stirring over a 15 minute period. The temperature of the reaction mixture is held at 15° to 20° C. during such addition. The reaction mixture is then stirred for 3.5 hours at 20° C. and permitted to stand overnight at room temperature. The solid (potassium acetate) is filtered from the mixture and washed with 250 milliliter proportions of anhydrous diethyl ether. The solvent is then removed from the combined filtrate and washings by evaporation. A yield of 2-ethylhexaldehyde cyanohydrin approaching the theoretical yield is obtained.

The nitrate ester of an aldehyde cyanohydrin is then prepared by esterification of the 2-ethylhexaldehyde cyanohydrin obtained as described above, with about 92.5 grams of white fuming nitric acid ($d=1.49$–$1.50$, i.e., approx. 95 percent) in about 246 milliliters of acetic anhydride. External cooling is employed while mixing the nitric acid and acetic anhydride to maintain the temperature below 35° C. The mixture of nitric acid and acetic anhydride is chilled to 5° C. and 0.6 mol of the 2-ethylhexaldehyde cyanohydrin is added thereto in one portion. The reaction mixture is stirred at 8° to 10° C. for 15 minutes and then for 1.5 hours at room temperature. At the conclusion of this period the reaction mixture is poured over 500 grams of crushed ice and stirred for one hour to quench the reaction mixture. The 2-ethylhexaldehyde cyanohydrin nitrate separates spontaneously from the dilute acid solution. The product is water-washed, dried over anhydrous sodium sulfate and distilled at reduced pressure. The properties of 2-ethylhexaldehyde cyanohydrin nitrate obtained as described were as follows:

acids. The properties disclosed herein appear to be shared by all members of the group of aldehyde cyanohydrin nitrates disclosed.

In order to demonstrate the utility of an aldehyde cyanohydrin nitrate of the type disclosed herein the 2-ethylhexaldehyde cyanohydrin nitrate of Example I was incorporated in a diesel fuel having a cetane number of 50–55-clear in the proportion of 0.5 percent by volume, that is, 0.00237 mol per 100 g. of oil, and the resulting cetane number improvement was determined by the procedure of ASTM test D–613–48T. This test is described in the

| | Density, 25° C. | Yield, percent | B.P., ° C. | $n_d^{20}$ | Analysis, percent | | | | | |
|---|---|---|---|---|---|---|---|---|---|---|
| | | | | | Nitrogen | | Carbon | | Hydrogen | |
| | | | | | Calculated | Found | Calculated | Found | Calculated | Found |
| 2-Ethylhexaldehyde cyanohydrin nitrate | 1.017 | 72.5 | [1] 77–79 | 1.4419 | 14.00 | 13.76 | 53.98 | 53.93 | 8.05 | 8.03 |

[1] 1.4 mm. Hg.

Other aldehyde cyanohydrin nitrates included by this invention and having similar properties can be obtained by substitution of other appropriate aldehydes on an equivalent weight for equivalent weight basis for the 2-ethylhexaldehyde of the preceding specific embodiment. For example, there can be substituted in the foregoing embodiment acetaldehyde, octaldehyde, and lauraldehyde. Also, there can be substituted in the foregoing specific embodiment on the same basis stearaldehyde, benzaldehyde, p-tolualdehyde, 1-naphthaldehyde, cinnamaldehyde, crotonaldehyde, anthraldehyde, cyclohexaldehyde and cyclopentaldehyde. In these instances there will be obtained respectively the following compounds:

Example II—acetaldehyde cyanohydrin nitrate
Example III—octaldehyde cyanohydrin nitrate
Example IV—lauraldehyde cyanohydrin nitrate
Example V—stearaldehyde cyanohydrin nitrate
Example VI—benzaldehyde cyanohydrin nitrate
Example VII—p-tolualdehyde cyanohydrin nitrate
Example VIII—1-naphthaldehyde cyanohydrin nitrate
Example IX—cinnamaldehyde cyanohydrin nitrate
Example X—crotonaldehyde cyanohydrin nitrate
Example XI—anthraldehyde cyanohydrin nitrate
Example XII—cyclohexaldehyde cyanohydrin nitrate
Example XIII—cyclopentaldehyde cyanohydrin nitrate The physical state of the aldehyde cyanohydrin nitrates of this invention normally follows that of the aldehydes from which they are derived. Accordingly, aldehyde cyanohydrin nitrates of this invention are usually normally liquid. The aldehyde cyanohydrin nitrates of this invention are oil-soluble and can be used as combustion improvement agents in hydrocarbon fuel oils. Hydrocarbon fuel oils containing aldehyde cyanohydrin nitrates of the kind described in this application are claimed separately in my application Serial No. 703,498, filed December 18, 1957, now U.S. Patent No. 2,927,012. The aldehyde cyanohydrin nitrates of this invention also are useful as intermediates in the preparation of α-keto nitriles, that is, acyl cyanides. Thus, the compounds of this invention will react with strong bases such as secondary or tertiary amines to form corresponding α-keto nitriles. For example, 2-ethylhexaldehyde cyanohydrin nitrate will react with a secondary amine to form 2-ethylhexoyl nitrile. Alpha keto nitriles can be hydrolized to from α-keto carboxylic ASTM Manual of Engine Test Methods for Rating Fuels for 1952 at pages 63–71. Briefly, this test involves comparing the ignition quality of an unknown test fuel under standard operating conditions with the ignition qualities of reference fuel blends having known cetane numbers. For purposes of comparison 0.5 percent by volume (0.00373 mol per 100 g. of oil) of amyl nitrate was incorporated in the same diesel fuel, and this fuel composition was subjected to the same test procedures. The respective cetane number improvements, corrected to 0.00237 mol/100 g. fuel, were as follows:

| | 2-Ethylhexaldehyde cyanohydrin nitrate | Amyl nitrate |
|---|---|---|
| Cetane number increase | 5.5 | 4.1 |

It will be apparent to those skilled in the art that many modifications and variations of the invention as described herein can be resorted to without departing from the spirit or scope thereof. Accordingly, only such limitations should be imposed as are indicated in the claims appended hereto.

I claim:
1. A nitrate ester of an aldehyde cyanohydrin wherein the radical attached to the carbon atom alpha to the cyano and nitrate groups is a radical selected from the group consisting of n-heptadecenyl, n-heptadecadienyl, cyclopentyl, cyclohexyl, phenyl, naphthyl, tolyl, cresyl, benzyl, cinnamyl, crotonyl, anthryl and alkyl radicals containing 1 to 18 carbon atoms.
2. A nitrate ester of an aldehyde cyanohydrin wherein the radical attached to the carbon atom alpha to the cyano and nitrate groups is an alkyl radical containing 1 to 12 carbon atoms.
3. The nitrate ester of 2-ethylhexaldehyde cyanohydrin.

References Cited by the Examiner
UNITED STATES PATENTS
1,685,771  10/1928  Bergeim _____ 260—465.6

CHARLES B. PARKER, *Primary Examiner*